United States Patent
Schindling et al.

[15] 3,635,003
[45] Jan. 18, 1972

[54] CENTRIFUGAL DUST COLLECTOR FOR THE WASTE GASES OF A SINTER MACHINE FOR ORES, BUILDING MATERIALS AND THE LIKE

[72] Inventors: Josef Schindling, Frankfurt am Main-Unterliederbach; Hermann Müller, Frankfurt am Main, both of Germany

[73] Assignee: Metallgesellschaft Aktiengesellschaft, Frankfurt am Main, Germany

[22] Filed: Aug. 18, 1969

[21] Appl. No.: 850,839

[30] Foreign Application Priority Data

Sept. 6, 1968 Germany..........................G 67 52 541

[52] U.S. Cl............................55/344, 55/346, 55/385, 263/28, 266/21
[51] Int. Cl..........................................................B01d 45/12
[58] Field of Search.................55/319, 342, 344, 345, 346, 55/348, 430, 385; 209/144, 211; 266/21; 263/28

[56] References Cited

UNITED STATES PATENTS

| | | | |
|---|---|---|---|
| 2,268,170 | 12/1941 | Schmidt | 55/334 |
| 2,768,890 | 10/1956 | Cover | 266/21 |
| 2,876,864 | 3/1959 | Dietrich | 266/21 |
| 2,890,038 | 6/1959 | Powell | 266/21 |
| 3,203,782 | 8/1965 | Meyer et al. | 266/21 |

OTHER PUBLICATIONS

Netherlands Application 300857 dated 11- 64 (1 sheet drawing- 4 sheets spec.)

*Primary Examiner*—Frank W. Lutter
*Assistant Examiner*—Bernard Nozick
*Attorney*—Francis D. Stephens and Hugo Huettig, Jr.

[57] ABSTRACT

Dust-ladened gases are drawn into a series of hoppers beneath the grate of a sintering machine and then passed into a centrifugal dust collector which extends along at least one side of the sintering machine.

3 Claims, 5 Drawing Figures

PATENTED JAN 18 1972 3,635,003

Inventors:
JOSEF SCHINDLING
HERMANN MÜLLER

CENTRIFUGAL DUST COLLECTOR FOR THE WASTE GASES OF A SINTER MACHINE FOR ORES, BUILDING MATERIALS AND THE LIKE

This invention relates to centrifugal dust collectors for the waste gases of sinter machines for ores, building materials and the like in which the waste gases are drawn through the charge fed on grates permeable to gas, and in which the waste gases are collected in individual series arranged suction boxes and finally led to the centrifugal dust collectors.

In practice, centrifugal collectors have proved well for the dedusting of the waste gases of a sinter machine, for instance for the burning of pellets or for the sintering of iron ores.

Such a sinter machine comprises a multiplicity of pallets joined to an endless belt. These pallets have gas permeable bottoms and run on rollers. Usually, the sinter machine has several waste gas zones, beginning for instance with a predrying zone for the green pellets, succeeded by a heating zone, a sintering zone and finally by cooling zones. According to the purpose of the respective zone, air is formed through the gas permeable charge for cooling and predrying, or air is drawn through the gas permeable charge in the heating and the sintering zone and finally cleaned in centrifugal dust collectors. In each of the waste gas zones to be dedusted there are different temperatures and the gas volumes vary over the length of the sinter machine.

Essentially two methods are used for the dust collection. In one method, the waste gases of all suction boxes are collected in a common gas main duct arranged along the suction boxes and conveyed to a common dust collector. In order to avoid deposition of dust, the collecting main has a plurality of hoppers with dust discharge devices.

Because large gas volumes have to be treated, the number of collecting cells of the common dust collector is accordingly great. As on one hand, the collecting main for the raw gas cannot be constructed very wide because of the high negative pressure and because of the danger of dust deposition, and as on the other hand, the collecting main has to be connected to the dust collector over the width of the dust collector, the latter has to be constructed with a large number of collecting cells in the depth. It is known that thereby a very different dust distribution in the individual cells is caused, furthermore very different gas flow resistance are formed for the front cells and for the cells in the rear. Thereby gas currents are occurring within the hoppers which are detrimental to the collecting efficiency.

The above-described method for the construction of one collecting gas main with one common dust collector is for the given reasons economically and technically disadvantageous.

Another known construction method provides the direct connection of the dust collectors to the suction boxes of the sintering machine with each suction box having an individual dust collector. As due to the sintering process the gas volumes of the individual suction boxes are different, the individual dust collectors are also dimensioned accordingly.

In operation of such plants it showed that the gas volumes of some suction boxes had to be throttled more or less in order to adjust the sintering process at an optimum and to run the other suction boxes with higher gas volumes. In this, the total gas volume remains practically constant. Thereby the nonthrottled individual dust collectors are operated with an overload which causes an increase of their pressure loss as well as of the total pressure which means that the power requirement of the exhaust fan increases. In addition, the overload causes a higher abrasion due to the sharp dust. On the other side, the throttled individual dust collectors are working with underload whereby a decrease of the collecting efficiency takes place.

The object of this invention is to overcome the above-described disadvantages by a special construction of the centrifugal dust collectors.

According to this invention, the problem is resolved by centrifugal collectors for the dedusting of the waste gases of a sintering machine for ores, building materials and the like in which the gases are drawn through the charge fed on a gas permeable grate and led to centrifugal dust collectors and in which the width of the centrifugal dust collectors are approximately equal to the length of the respective suction boxes.

This construction method has the advantage than an essentially wider raw gas inlet for the centrifugal collectors is formed, the width being about equal to the length of the respective suction boxes so that only few collecting cells in the depth have to be arranged. Thereby the disadvantages are eliminated which are caused by the different pressure losses of the cells in the rear as compared with the cells in the front resulting in a lowered collecting efficiency.

In wide sinter machines, the dust collecting device can also be arranged on both sides of the sinter machine approximately over the length of the suction boxes.

According to a further modification of this invention, the width of the centrifugal collectors is approximately equal to the length of the suction boxes of one waste gas zone.

As the individual waste gas zones have different temperatures and dust content, and as different gas volumes have to be drawn off, it is especially advantageous to dedust the suction boxes of one waste gas zone in one common dust collector arranged along these suction boxes.

According to another preferred modification of this invention, the suction boxes are individually connected to the centrifugal dust collector by separate conduits. The conduits have throttle valves by means of which the air volumes required for an optimum sintering are adjusted. There are no collecting gas mains.

The means by which the objects of this invention are obtained are described more fully with reference to the accompanying drawings in which.

Figure 1:
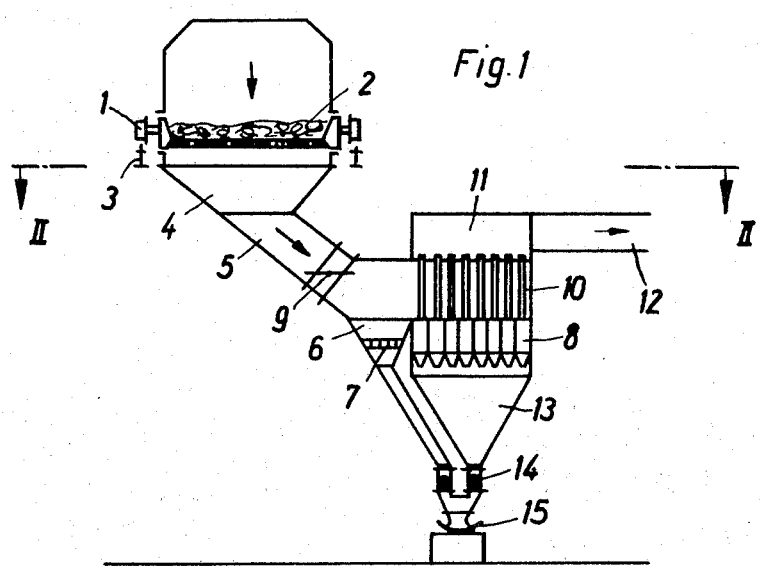
FIG. 1 is a cross-sectional view taken on the line I—I, FIG. 2, of a sintering machine with grate, suction box and centrifugal dust collector.
Figure 2:
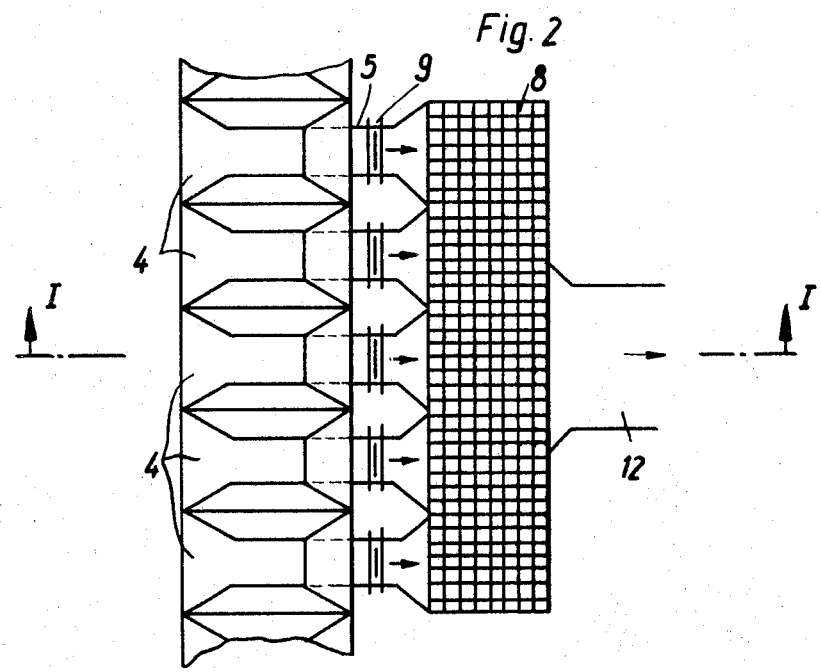
FIG. 2 is a plan view taken on the line II—II of FIG. 1 with a centrifugal dust collector arranged along the suction boxes.

The pallets 1 of the sinter machine carry the charge 2 to be processed. Underneath the pallets which are running on rails 3 are arranged the stationary suction boxes 4 with waste gas conduits 5, the bottoms of which are formed as hopper spouts 6 containing catch grates 7. Throttle valves 9 are installed in the waste gas conduits 5 in order to adjust the waste gas volumes of the individual suction boxes. The different gas volumes are distributed in the raw gas section 10 of the common centrifugal dust collector 8. After the dust has been removed, the clean gas is collected in a clean gas hood 11 and discharged through the clean gas conduits 12. Underneath the centrifugal dust collector 8 which consists of many individual cells is arranged the dust collecting hopper 13 with a dust discharge device 14 for discharging the dust on a belt conveyor 15 for removal.

Preferably the centrifugal dust collector 8 is placed on rollers along the suction boxes 4 in order to compensate for the movements of the sinter machine. The width of the centrifugal dust collector 8 is chosen about equal to the length of the respective suction boxes and the depth normal to the sinter machine depends on the necessary number of collecting cells. Thus the waste gas conduits 5 of all suction boxes 4 can directly be connected to the centrifugal dust collector 8 according to FIGS. 1 to 5.

The adjustment of the gas volumes from the different suction boxes 4 takes place by means of throttle valves 9 installed in the waste gas conduits 5 ahead of the centrifugal dust collector 8. The different gas volumes caused by the adjustment are distributed in the raw gas section 10 of the centrifugal dust collector 8 to adjacent collecting cells according to their pressure loss. Consequently, the above-described overload or underload respectively associated with individual dust collectors are equalized.

The waste gas suction conduits 5 of the suction boxes 4 are provided with hopper spouts 6 into which the coarse dust falling out due to the change of the gas flow direction can settle. In the upper ends of the hopper spouts 6 catch grates 7 are installed which retain lumps of the charge possible falling through and broken grate bars in order not to obstruct the dust discharge devices 14. During an occasional shutdown of the plant such foreign matter can be removed from the catch grates.

Figure 3:
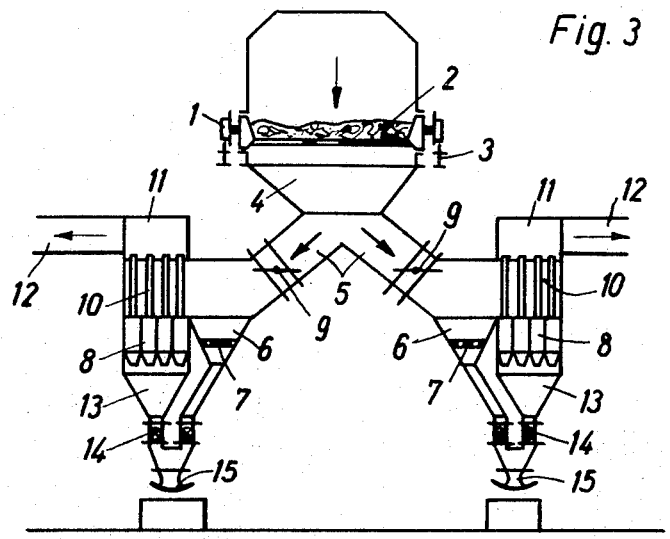
FIG. 3 is a cross-sectional view of a sinter machine according to FIG. 1 but with centrifugal dust collectors arranged on both sides of the sinter machine.

In case the pallets 1 of for instance a pellet burning machine are very wide the centrifugal dust collectors are preferable arranged on both sides along the burning machine as illustrated in FIG. 3.

Figure 4:
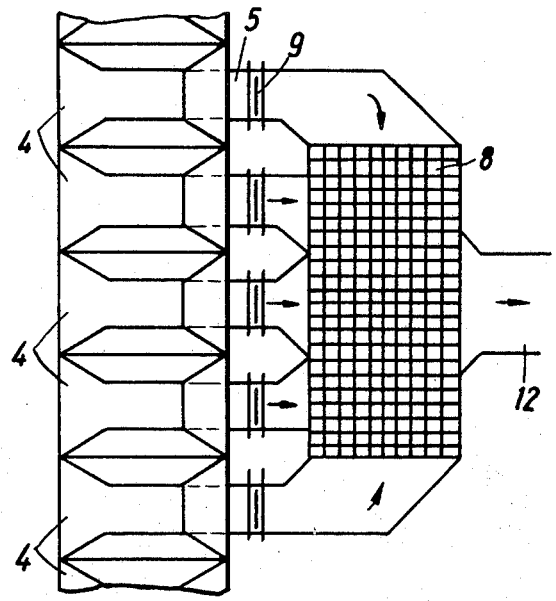
FIG. 4 is a plan view of a modification of FIG. 2 with the centrifugal dust collectors along one waste gas zone.

If the centrifugal dust collectors are situated along a waste gas zone, the dust containing waste gas is admitted to the dust collector as shown in FIG. 4. In this the gas inlet takes place along the length of the series arranged suction boxes 4 of the waste gas zone, and for the end suction boxes the gas inlet is on the sides of the centrifugal dust collector.

Figure 5:
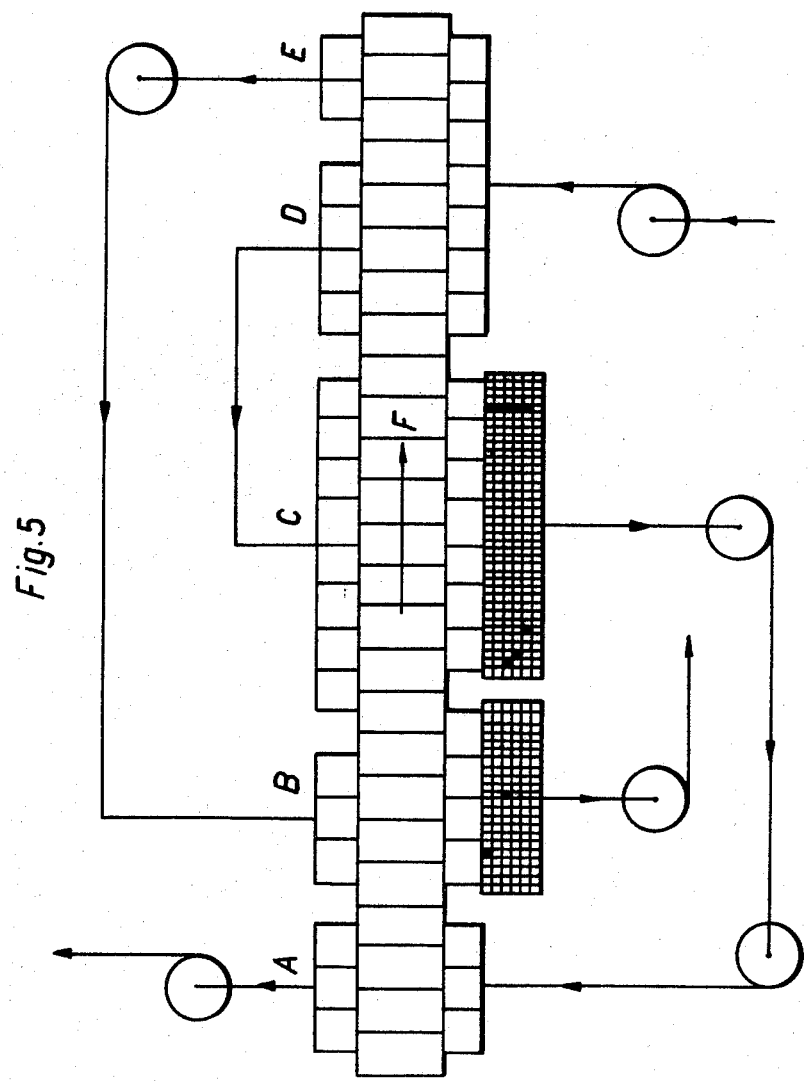
FIG. 5 is a schematic view of a sinter machine for burning pellets with diverse waste gas zones.

FIG. 5 shows the air/waste gas conduits of a pellet burning machine with various waste gas zones. The pallets of the burning machine move in the direction of the arrow F travelling through the zones "A" to "E." In this "A" is the drying zone for the green pellets, "B" is the heating zone and "C" the burning zone proper. "D" and "E" are the cooling zones for the burned pellets. Dedusted are the zones "B" and "C" through which is sucked the air preheated in zones "D" and "E." By drying the pellets the moisture is largely eliminated and there are no waste gas problems caused by moisture dust.

Having now described the means by which the objects of this invention are obtained,

We claim:

1. A sintering and dust collecting system including a multicell centrifugal dust separator having a housing one longitudinal side of which is open to constitute a gas inlet, a gas outlet connected to said housing, a sintering and burning machine for ores or the like having a permeable movable grate, suction boxes positioned below said gas permeable grate arranged adjacent one another in series along the length of the machine, gas removal conduits connected to said suction boxes, each conduit being provided with a throttling valve, bunkers with catch screens connected to said conduits one adjacent each said valve, said gas removal conduits from the suction boxes being arranged adjacent one another and connected directly to the gas inlet of said multicell centrifugal force dust separator along its entire length the gas inlet being substantially equal in length to the combined length of the suction boxes along the length of the sintering machine.

2. The system of claim 1 in which two said multicell centrifugal force dust separators are provided each said dust separator being operatively connected to each said suction box by a said conduit.

3. The system of claim 1 in which two said multicell centrifugal force dust separators are provided, a first of dust separators being operatively connected to a first series of said suction boxes of said sintering machine, and the second of said dust separators being operatively connected to a second series of said suction boxes of said sintering machine.

* * * * *